Nov. 20, 1923.

J. W. KIRBY 1,474,530

STOCK WATERING TANK

Filed March 22, 1922    2 Sheets-Sheet 1

Inventor
James W. Kirby.
By
Lacy & Lacy, Attorneys

Nov. 20, 1923.   1,474,530
J. W. KIRBY
STOCK WATERING TANK
Filed March 22, 1922   2 Sheets-Sheet 2

Inventor
James W. Kirby.
By Lacy & Lacy, Attorneys

Patented Nov. 20, 1923.

1,474,530

UNITED STATES PATENT OFFICE.

JAMES W. KIRBY, OF HARLAN, IOWA.

STOCK-WATERING TANK.

Application filed March 22, 1922. Serial No. 545,815.

*To all whom it may concern:*

Be it known that I, JAMES W. KIRBY, a citizen of the United States, residing at Harlan, in the county of Shelby and State of Iowa, have invented certain new and useful Improvements in Stock-Watering Tanks, of which the following is a specification.

This invention relates to stock-watering tanks and has for its object the provision of means whereby the water may be maintained at a temperature suitable for drinking and the supply of water within the tank automatically maintained. A further object of the invention is to provide means whereby the outlets through which the water is used by the animals may be kept in a sanitary condition. Other objects of the invention will appear incidentally in the course of the following description.

In the annexed drawings which illustrate one embodiment of my invention—

Figures 1, 4:
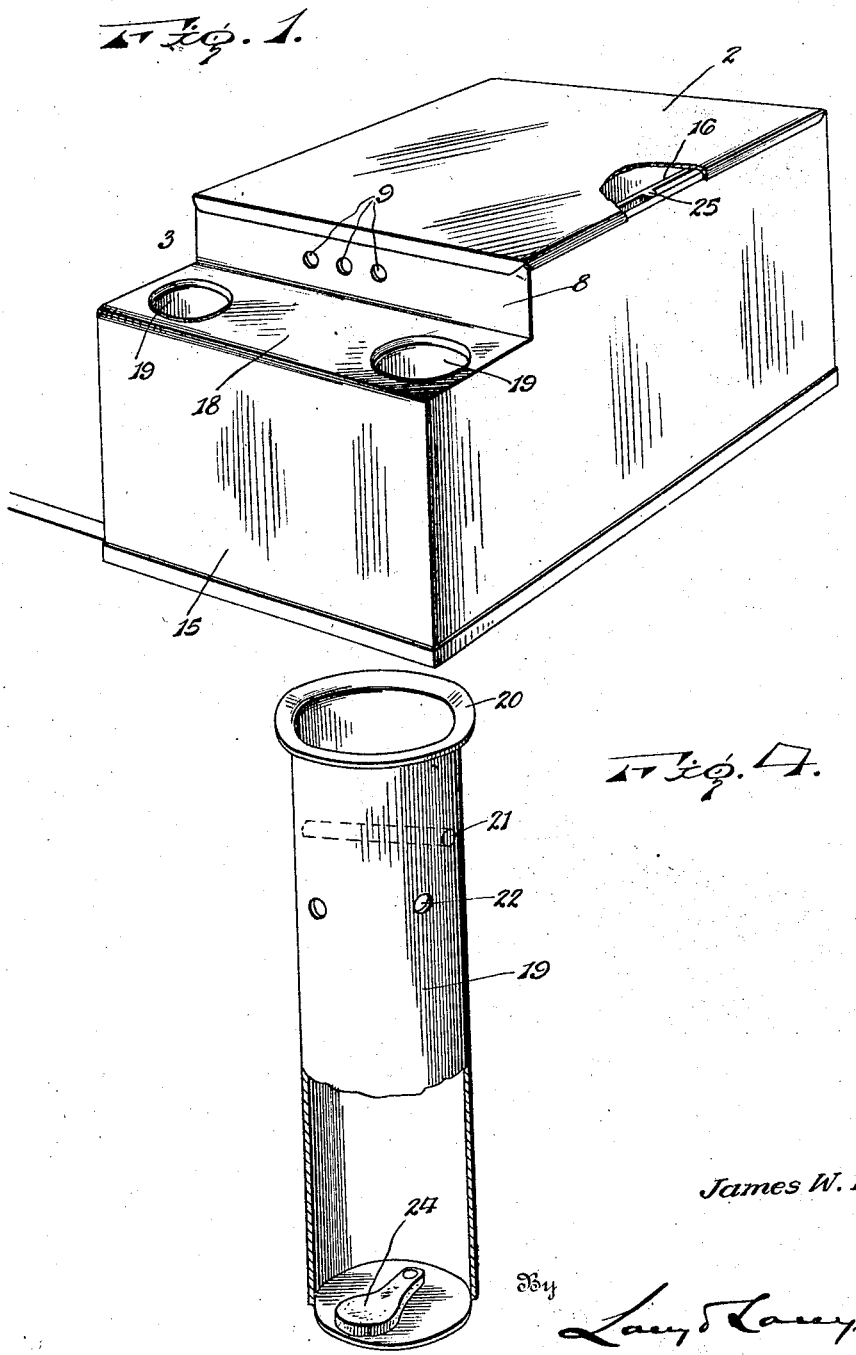
Figure 1 is a perspective view of my improved stock-watering tank partly broken away.
Fig. 4 is a detail perspective view, partly broken away and in section, of one of the drinking cups or outlets.

In carrying out my invention, I employ a tank 1 which may be of any desired dimensions and is equipped with a removable cover or lid 2 whereby access to the interior of the tank may be had whenever desired, but the entrance of dirt or other impurities will be prevented. The tank is preferably of a step formation, as indicated at 3, and within the tank is disposed a heating compartment 4 of like form. This heating compartment may conveniently be a container having supporting flanges or feet 5 on its under side whereby its bottom 6 will be maintained in spaced relation to the bottom of the tank and having an open top, as shown at 7, whereby the surplus heat and products of combustion may escape. Through the riser portion 8 of the stepped end of the tank, I provide vent openings 9 which permit the fumes and other products of combustion from the lamp or heater 10 to escape to the atmosphere. While the heater may be of any desired form, I have illustrated and employed an oil lamp which may be readily inserted through the open top 7 of the heating compartment and then pushed under the tread member of the stepped end of the same. The heating compartment or heater container is also preferably of such dimensions that by shifting it rearwardly or from under the stepped end of the tank it may be readily lifted from the tank when cleaning is desirable or repairs are necessary.

Water is supplied to the tank from any convenient source of supply through a feed pipe 11 which enters the bottom of the tank and is equipped with a valve 12 controlled by a float 13 in a well-known manner so that the level of the water in the tank will be maintained relatively constant. The tank is also provided with an outer wall 15 in spaced relation to its inner wall 16 so that a surrounding air chamber 17 is produced whereby the contact of the animals with a highly heated surface of the tank will be prevented and rapid chilling or excessive heating of the water will be avoided.

Figure 3:
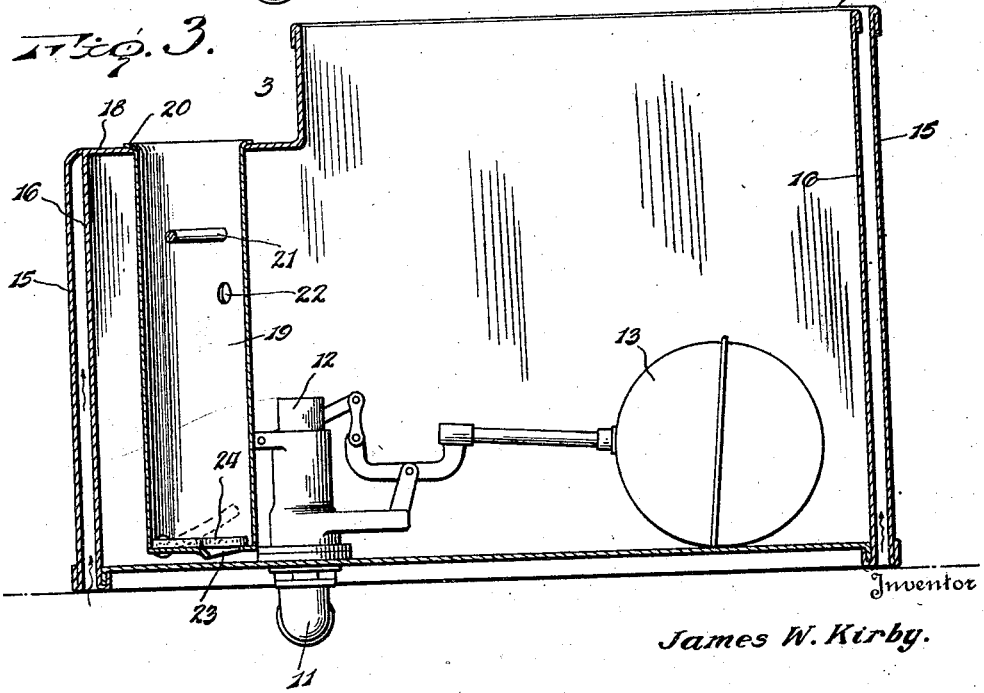
Fig. 3 is a vertical longitudinal section taken between the heating compartment and the point of water admission.

Within the tread member 18 of the stepped end of the tank, I provide drinking openings in which are fitted cups or pipes 19. These drinking cups 19 are provided at their upper ends with lateral annular flanges 20 adapted to rest upon the tread surface 18, as shown clearly in Fig. 3, so that the cup will be supported in the tank but may be readily removed therefrom to be cleaned, and to facilitate the removal a cross bar or pin 21 is provided within each cup to serve as a handle in an obvious manner. Openings 22 are also provided in the wall of each cup, and in the bottom of each cup is an inlet opening 23 controlled by a flap valve 24. When a drinking cup has been cleaned and is reinserted in its place, the valve 24 will open as the cup is pushed downwardly and will permit the water to flow in through the opening 23 to fill the cup without making it necessary to wait for the water in the tank to reach the level of the openings 22 and enter the cup through the same.

To prevent collapse of the outer wall 15 of the tank, spacing ribs 25 may be provided at intervals upon the inner wall 16, as shown in Fig. 1.

Figure 2:
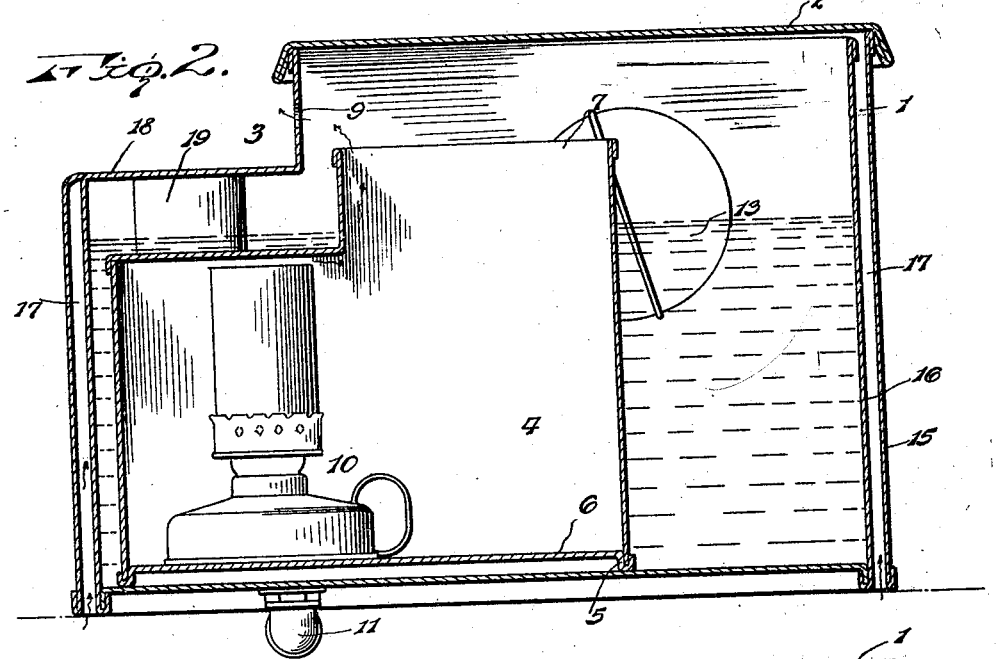
Fig. 2 is a vertical central longitudinal section of the same.

It is thought the operation of the device will be readily understood from the foregoing description, taken in connection with the accompanying drawings. The tank having been set up at the place of use, the heater is lighted and then placed in proper position within the heating compartment or container 4, and said container or compartment pushed forwardly in the tank so that the heater will be located adjacent and between the drinking cups. The animals will drink through the upper ends of the cups as is obvious and as water is consumed the float will drop with the level of the water and thereby open the valve 12 so that additional water may flow into the tank and replenish the supply. The smoke and fumes rising from the heater will flow through the open top of the heating compartment and pass immediately to and through the vent openings 9, as indicated by the arrows in Fig. 2, so that contamination of the water cannot occur. The animals may readily reach the water through the open tops of the drinking cups and these cups may be removed and cleaned as often as necessary in order to maintain the parts in sanitary condition. The device is exceedingly simple in the construction and arrangement of its parts and may be produced at a low cost.

Having thus described the invention, what is claimed as new is:

A device for the purpose set forth comprising a tank having a stepped top and furnishing an open water chamber, a spaced casing around the tank and open at top and bottom, a lid fitting over the top opening of said casing, a container removably disposed within said chamber and providing a heater compartment, a roof over the stepped portion of said top, a cup removably fitted in said roof and depending into said chamber, said cup having a valved bottom opening, and constantly open passages adjacent its upper end.

In testimony whereof I affix my signature.

JAMES W. KIRBY. [L. S.]